(12) United States Patent
Lykken

(10) Patent No.: US 10,370,046 B2
(45) Date of Patent: Aug. 6, 2019

(54) TRACK UNDERCARRIAGE CAMBER STOP METHOD

(71) Applicant: Norwood Sales, Inc., Horace, ND (US)

(72) Inventor: Tom Lykken, Fargo, ND (US)

(73) Assignee: Norwood Sales, Inc., Horace, ND (US)

( * ) Notice: Subject to any disclaimer, the term of this patent is extended or adjusted under 35 U.S.C. 154(b) by 0 days.

(21) Appl. No.: 15/411,622

(22) Filed: Jan. 20, 2017

(65) Prior Publication Data

US 2017/0210435 A1 Jul. 27, 2017

Related U.S. Application Data

(60) Provisional application No. 62/286,194, filed on Jan. 22, 2016.

(51) Int. Cl.
| B62D 55/14 | (2006.01) |
| B62D 55/084 | (2006.01) |
| A01B 51/04 | (2006.01) |
| A01B 76/00 | (2006.01) |
| B62D 55/104 | (2006.01) |
| B62D 17/00 | (2006.01) |

(52) U.S. Cl.
CPC ............ *B62D 55/084* (2013.01); *A01B 51/04* (2013.01); *A01B 76/00* (2013.01); *B62D 55/104* (2013.01); *B62D 55/14* (2013.01); *B62D 17/00* (2013.01)

(58) Field of Classification Search
CPC ...... B62D 55/084; B62D 55/14; B62D 55/20; B62D 55/24; A01B 51/04; A01B 76/00
See application file for complete search history.

(56) References Cited

U.S. PATENT DOCUMENTS

| 9,221,475 | B2* | 12/2015 | Voisine | ................ B61F 99/00 |
| 9,446,803 | B2* | 9/2016 | Tabbut | ................ B62D 55/32 |
| 9,688,322 | B1* | 6/2017 | Prickel | ................ B62D 55/084 |
| 2014/0166376 | A1* | 6/2014 | Maier | ................ B62D 55/0842 180/9.5 |
| 2015/0321708 | A1* | 11/2015 | Van Mill | ................ B62D 55/305 280/28.5 |
| 2015/0367901 | A1* | 12/2015 | Studer | ................ B62D 55/075 180/9.42 |
| 2016/0362149 | A1* | 12/2016 | Erlinger | ................ B60G 1/04 |
| 2017/0291651 | A1* | 10/2017 | Prickel | ................ B62D 55/084 |

* cited by examiner

*Primary Examiner* — Joseph M Rocca
*Assistant Examiner* — Marlon A Arce
(74) *Attorney, Agent, or Firm* — Schwegman Lundberg & Woessner, P.A.

(57) ABSTRACT

An undercarriage assembly including a track assembly that can be oriented to align with the primary roll axis of the farm implement. The track assembly can be pivotably connected to an undercarriage arm of the farm implement such that the track assembly can be pivoted about a pivot axis parallel to the roll axis of the farm implement. In this configuration, when moving a farm implement in a direction parallel to the roll axis, the track assembly can pivot around the pivot axis in response to an angled road surface to maximize the amount of the track surface that contacts the road surface.

17 Claims, 6 Drawing Sheets

TRACK UNDERCARRIAGE CAMBER STOP METHOD

CLAIM OF PRIORITY

This patent application claims the benefit of priority, under 35 U.S.C. Section 119(e), to Tom Lykken U.S. Patent Application Ser. No. 62/286,194, entitled "TRACK UNDERCARRIAGE CAMBER STOP METHOD," filed on Jan. 22, 2016, each of which is hereby incorporated by reference herein in its entirety.

TECHNICAL FIELD

This document pertains generally, but not by way of limitation, to track undercarriage systems for farming implements.

BACKGROUND

In recent years, the average acreage of individual farms has continually increased. To efficiently process the greater acreage, modern farming implements have correspondingly increased in size to maximize the number rows that can be planted, treated, harvested, or otherwise processed with each pass of the farm implement. However, the corresponding increased weight of modern farm implements can compact the soil or planted crops beneath the undercarriage of the farm implement, which can hinder planting or damage crops. As such, processing of fields is often limited or delayed until planted crops reach sufficient size to survive compacting by undercarriage of the farm implement.

To accommodate the additional weight, farm implements can often be fitted with rubber track undercarriages that distribute the weight of the farm implement over a larger surface area. The increased floatation provided by the rubber tracks reduces compaction of the soil and crops allowing more frequent and earlier use of the farm implements. However, while rubber tracks are advantageous for moving the heavy implement across loose soil or a planted field, the rubber tracks are susceptible to damage when traveling on tarmac.

Farm implements are frequently driven on roads when being transported between fields. The residual heat of the road or the heat generated from friction between the rubber track and the tarmac can destroy or greatly reduce the effective life of the rubber track. Also, roads are often rounded or crowned to angle the road surface causing precipitation to run off the road. Typically, the road surface is angled downward from a center apex of the road such that precipitation runs off the sides of the road. The angling of the road surface and the large width of the farm implement can cause only a portion of the rubber track to contact the road concentrating the weight typically distributed across the entirety of the rubber track within the limited contacting portion. The increased friction between the contact portion and the road can cause localized heating increasing the wear rate at which the contact portion. Also, concentrating the weight within the contact portion reduces the overall weight that can be supported by the support structures of the rubber track.

Overview

The present inventors have recognized, among other things, that a problem to be solved can include the increased wear on rubber track undercarriages and the reduced load capacity caused by crowned or uneven road surfaces. In an example, the present subject matter can provide a solution to this problem, such as by a farm implement including a track assembly that can be oriented to align with the primary roll axis of the farm implement. The track assembly can be pivotably connected to an undercarriage arm of the farm implement such that the track assembly can be pivoted about a pivot axis parallel to the primary roll axis of the farm implement. In this configuration, when moving a farm implement in a direction parallel to the primary roll axis (e.g. down a road), the track assembly can pivot around the pivot axis in response to an angled road surface to maximize the amount of the track surface that contacts the road surface. The increased contact area between the road surface and the track surface avoids localized heating of certain areas of the track surface that can cause heated areas of the track surface to wear faster that other regions.

This overview is intended to provide an overview of subject matter of the present patent application. It is not intended to provide an exclusive or exhaustive explanation of the present subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
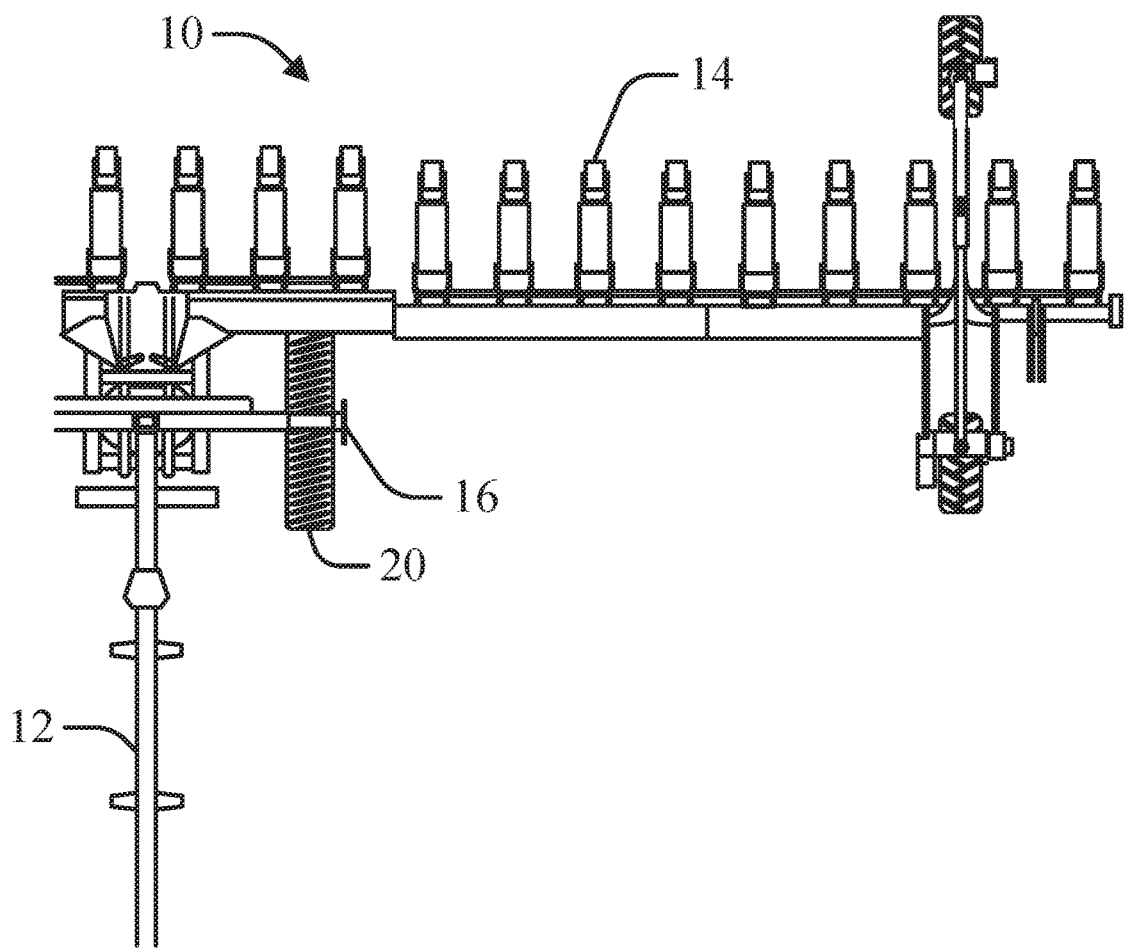
FIG. 1 is a schematic diagram of a farm implement according to an example of the present disclosure.

As illustrated in FIG. 1, a farm implement 10, according to an example of the present disclosure, can include an implement frame 12 and at least one farming tool 14 mounted on the implement frame 12. The farming tool 14 can include but is not limited to soil cultivation, planting, fertilizing, irrigation, and harvesting implements. The farm implement 10 can further comprise at least one undercarriage assembly 16 for supporting the farm implement 10. The undercarriage assembly 16 can include an undercarriage arm 18 operably connected to the implement frame 12 and pivotably connected to a track assembly 20.

As illustrated in the FIG. 1, the farm implement 10 can be driven or pulled along a roll axis x-x. The farm implement 10 can be configured to be towed, driving by at least one of the track assemblies 20, driven by a drive system (not shown), or a combination thereof. For the purposes of this disclosure, the roll axis x-x is the longitudinal axis extending from the center of the front end of the farm implement 10 to the center of the rear end of the farm implement 10 such that moving the farm implement 10 straight forward or backwards moves the farm implement 10 along the roll axis x-x.

Figure 2:
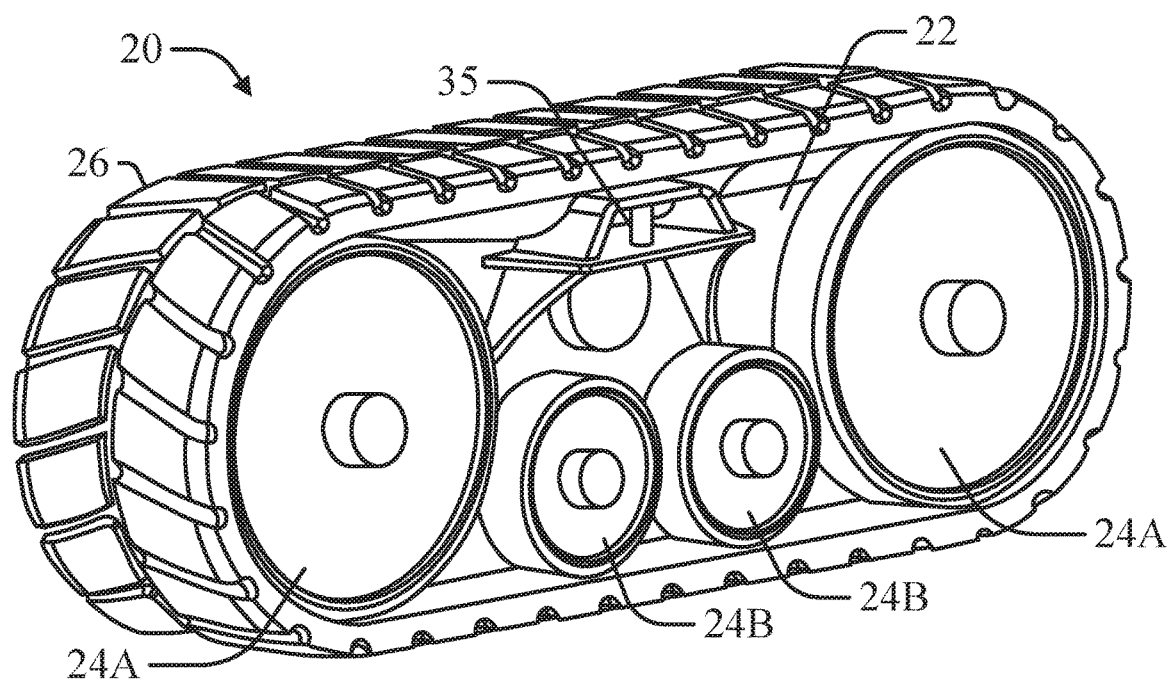
FIG. 2 is a front perspective view of a track assembly according to an example of the present disclosure.
Figure 3:
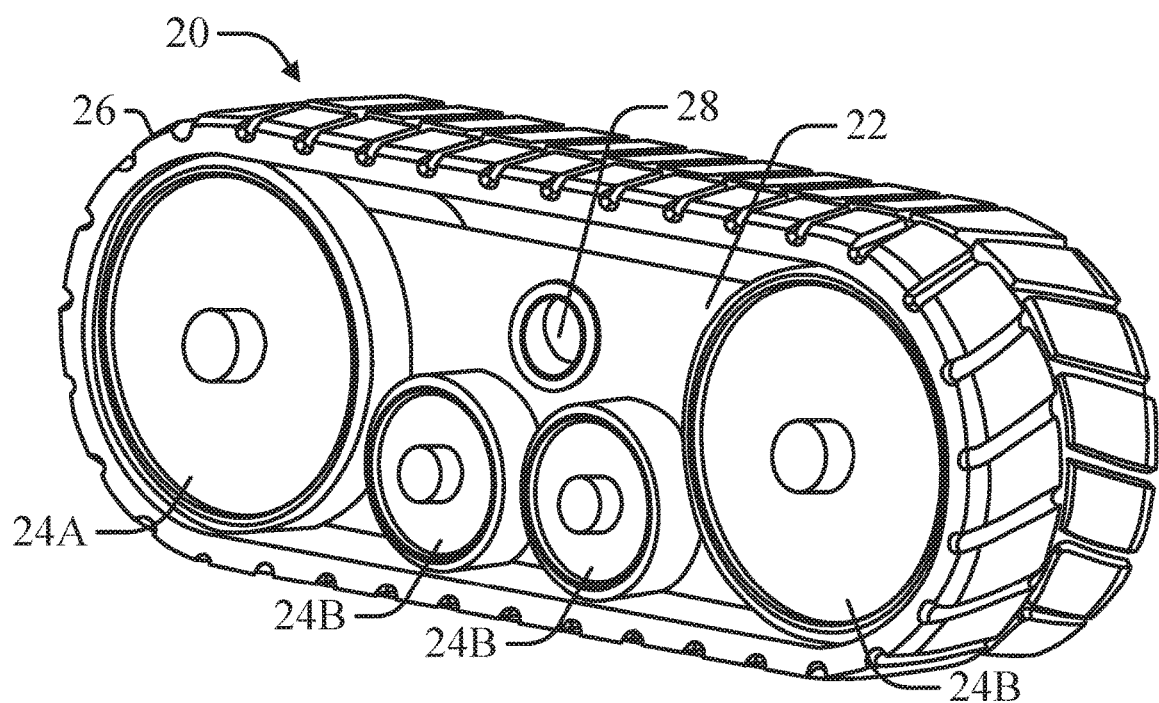
FIG. 3 is a rear perspective view of the track assembly depicted in FIG. 1.

As depicted in FIGS. 2-3, a track assembly 20, according to an example, can include a track frame 22 and a plurality of rollers 24 positioned on the track frame 22. A continuous track 26 moveable around the plurality of roller 24. The continuous track 26 can comprise rubber, elastomer, metal plates and linkages, and other flexible material or segments. In an example, the plurality of rollers 24 can include at least two idler rollers 24A and at least one secondary roller 24B, wherein the idler rollers 24A have a larger diameter than the secondary rollers 24B. The idler rollers 24A can be positioned apart to form a planar portion of the continuous track 26 for contacting an underlying surface, where the secondary rollers 24B are positioned between the idler rollers 24A to minimize deformation of the continuous track 26 between the idler rollers 24A.

Figure 4:
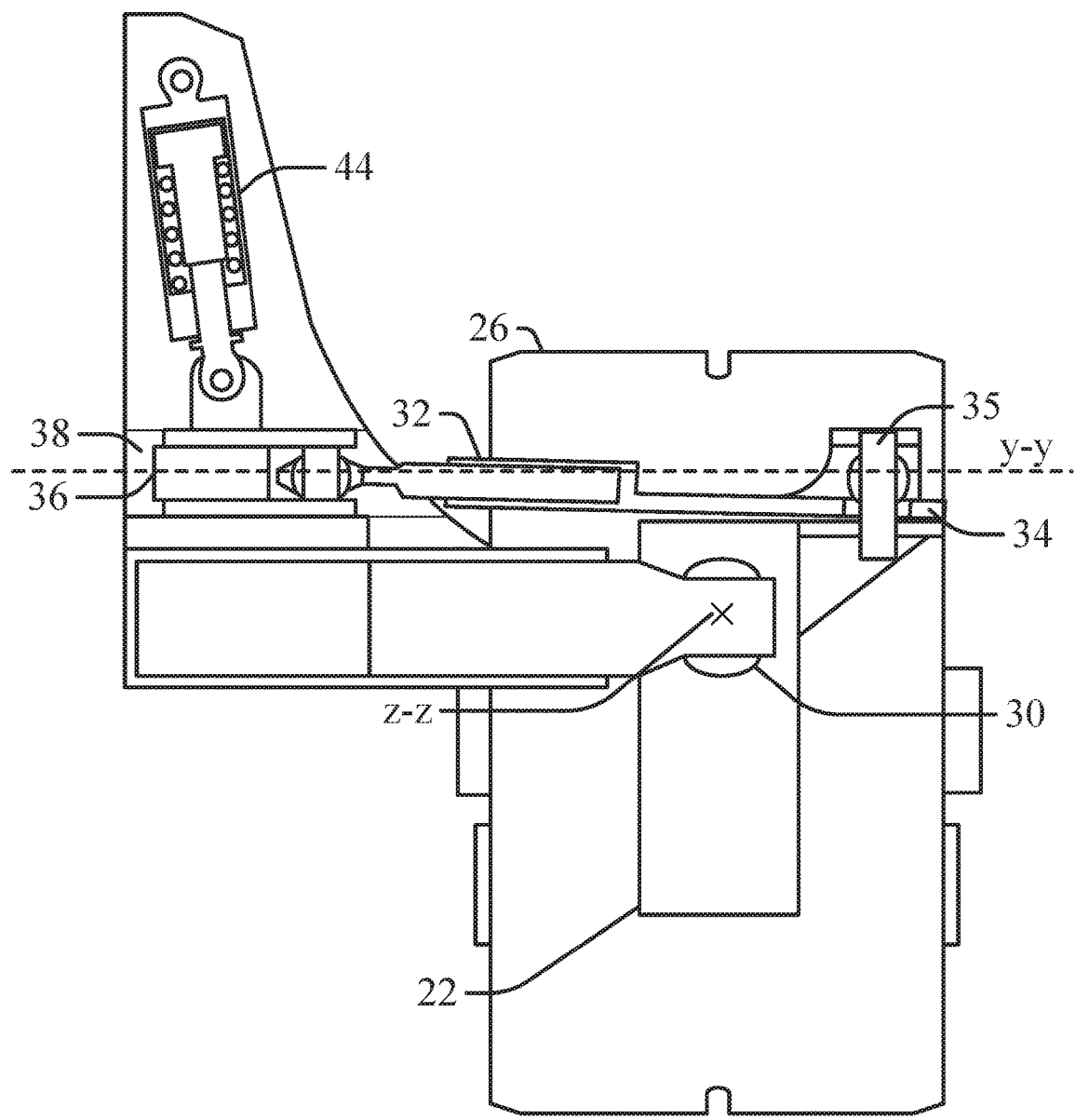
FIG. 4 is a schematic rear view of an undercarriage assembly according to an example of the present disclosure.

As depicted in FIGS. 3-4, the track frame 22 can include a socket 28 for receiving a bearing stud 30 of the undercarriage arm 18. The unitary ball configuration can permit pivoting of the track assembly 20, and correspondingly the planar portion of the continuous track 26, relative to the undercarriage arm 18. In an example, the undercarriage arm 18 can include a vertical adjustment assembly (not shown) operably connecting the undercarriage arm 18 to the implement frame 12. The vertical adjustment assembly can move the undercarriage arm 18 vertically or pivot the undercarriage arm 18 to move the track assembly 20 vertically. In an example, the vertical adjustment assembly can include but is not limited to a shock absorbing element for dampening vertical irregularities in the road surface.

As depicted in FIG. 4, in an example, the undercarriage assembly 16 can further comprise a tilt control linkage 32 providing a second connection between the undercarriage arm 18 and the track assembly 20. The tilt control linkage 32 can include a first end 34 pivotably connected to a connection rod 35 of track frame 22. The tilt control linkage 32 can also include a camber stop block 36 positioned at a second end opposite the first end 34. The camber stop block 36 can be slidably receive within a track 38 within the undercarriage arm 18.

Figure 5:
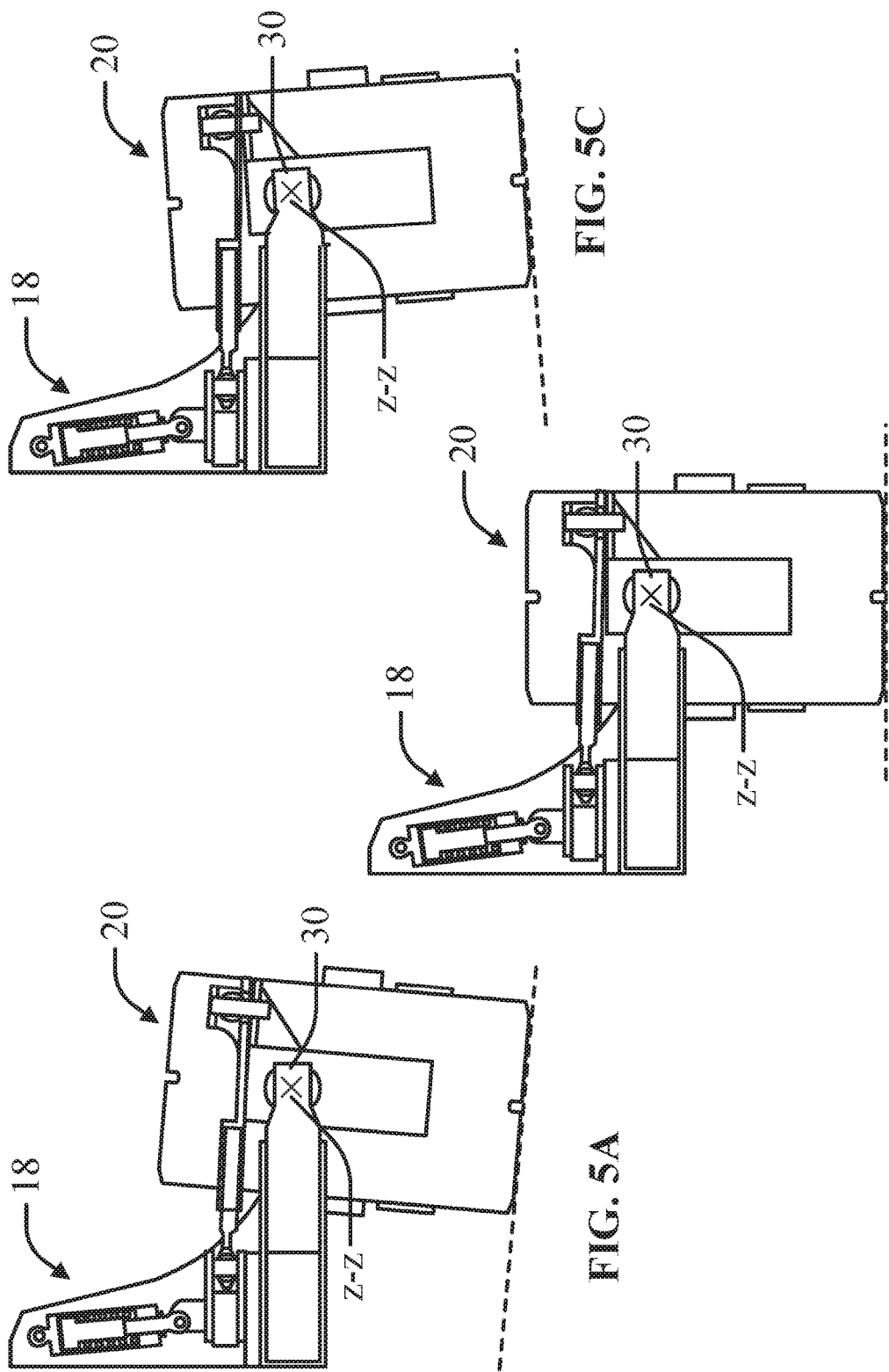
FIG. 5A is a schematic rear view of an undercarriage assembly having a negatively pivoted track assembly according to an example of the present disclosure.
FIG. 5B is a schematic rear view of an undercarriage assembly having a neutrally oriented track assembly according to an example of the present disclosure.
FIG. 5C is a schematic rear view of an undercarriage assembly having a positively pivoted track assembly according to an example of the present disclosure.

As illustrated in FIG. 5A-C, the camber slot block 36 can be slid along a slide axis y-y within the track 38 to pivot the track assembly 20 around pivot axis z-z. In an example, the track assembly 20 can pivot at least about +/−20 degrees about pivot axis z-z. In another example, the track assembly 20 can pivot at least about +/−10 degrees about the pivot axis z-z. In another example, the track assembly 20 can pivot at least about +/−5 degrees about the pivot axis z-z. The camber stop block 36 can be mechanically moved by a motor or hydraulic piston. In an example, camber stop block 36 can freely slide within the track 38 to permit the track assembly 20 pivot freely. The track assembly 20 can oriented such that pivot axis z-z is parallel to the roll axis x-x. In this configuration, the planar portion of the continuous track 26 can be oriented to correspond to the angle of the underlying surface. For example, the planar portion of the continuous track 26 can be oriented to correspond to a crowned or otherwise angled road surface. In an example, the tilt control linkage 32 can limit or prevent rotation of track assembly 20 in about axis transverse to the pivot axis z-z.

Figure 6:
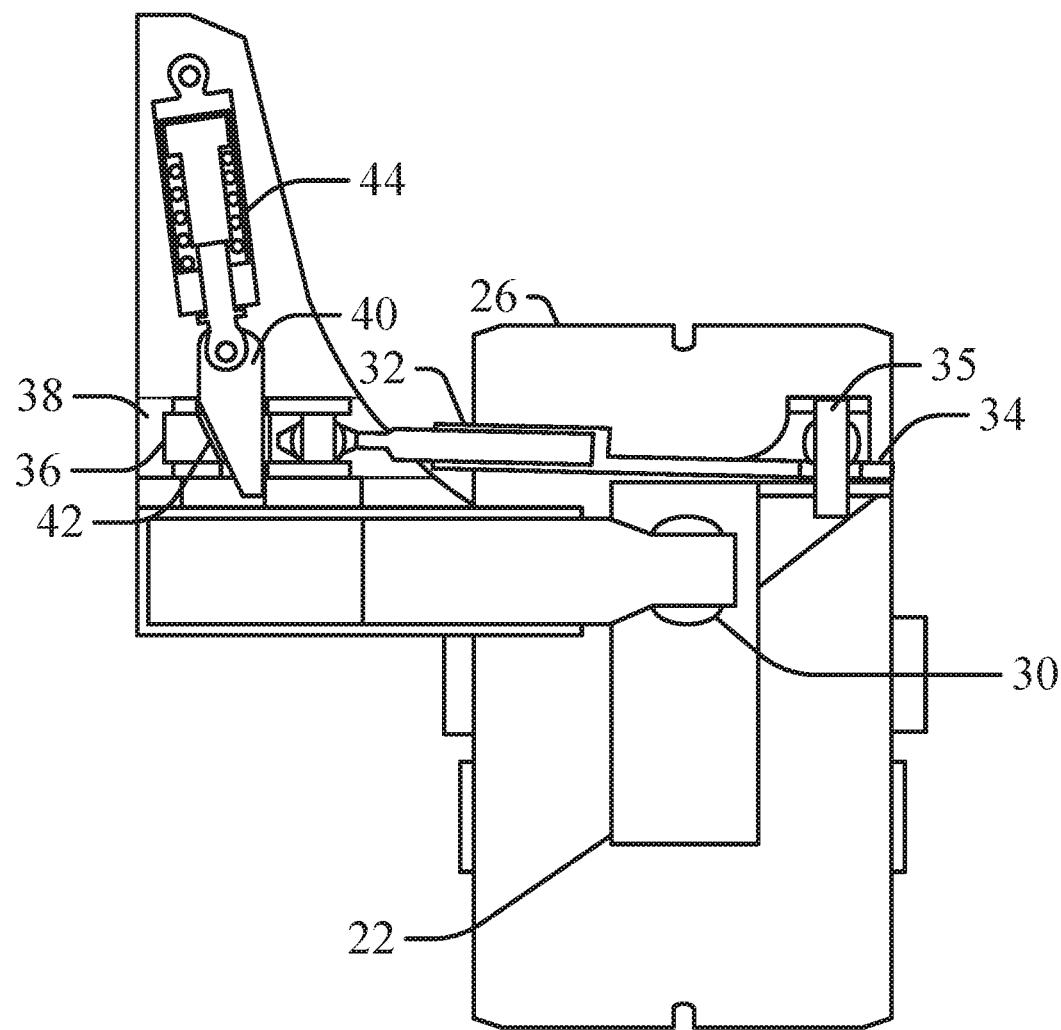
FIG. 6 is a schematic rear view of an undercarriage assembly according to an example of the present disclosure.

In an example, the camber stop block 36 can be mechanically moved by a motor or hydraulic piston 44. In another example, camber stop block 36 can freely slide within the track 38 to permit the track assembly 20 pivot freely. As depicted in FIG. 6, the undercarriage arm 18 can include a camber stop plate 40 moveable to intersect the track 38 and engage the camber stop block 36. In an example, the camber stop block 36 can include a slot 42 for receiving the camber stop plate 40. The camber stop plate 40 can engage the camber stop block 36 to prevent sliding of the camber stop block 36 and fix the pivot of the track assembly 20 via the tilt control linkage 32.

Various Notes & Examples

Example 1 is an undercarriage assembly for a farm implement, comprising: an undercarriage arm; and a track assembly pivotably connected to the undercarriage arm, the track assembly having a continuous track moveable around a plurality of rollers to contact an underlying surface beneath the farm implement; wherein the track assembly is configured to pivot about a pivot axis parallel to a roll axis of the farm implement to align the continuous track with the underlying surface.

In Example 2, the subject matter of Example 1 optionally includes wherein the track assembly further comprises: a track frame defining a socket for receiving a bearing stud of the undercarriage arm to pivotably connected the track assembly to the undercarriage arm; wherein the plurality of rollers are mounted on the track frame such that pivoting the track frame pivots the continuous track.

In Example 3, the subject matter of Example 2 optionally includes wherein the plurality of rollers comprises: at least two idler rollers; and at least one secondary roller positioned between the idler wheels; wherein the idler wheels and the secondary roller are oriented in a linear configuration to define a planar portion of the continuous track for interfacing with the underlying surface.

In Example 4, the subject matter of any one or more of Examples 1-3 optionally include a tilt control linkage having a first end pivotably connected to the track assembly and a second end having a stop block slidably received within a track in the undercarriage arm.

In Example 5, the subject matter of Example 4, wherein the camber stop block is slidable within the track along a slide axis transverse to the pivot axis to pivot the track assembly around the pivot axis.

In Example 6, the subject matter of Example 5 optionally includes wherein the undercarriage arm further comprises a camber stop plate moveable to engage the camber stop block; wherein the camber stop plate prevents sliding of the camber stop block and pivoting of the track assembly about the pivot axis.

In Example 7, the subject matter of any one or more of Examples 4-6 optionally include wherein the tilt control linkage is offset from the undercarriage arm such that the tilt control linkage and undercarriage arm limit rotation of the track assembly in a plane parallel to the pivot axis.

In Example 8, the subject matter of any one or more of Examples 1-7 optionally include wherein the undercarriage arm further comprises: a vertical adjustment assembly for moving the undercarriage arm along a vertical axis to elevate and lower the track assembly.

Example 9 is a farm implement, comprising: an implement frame, wherein at least one farming tool is mounted on the implement frame; an undercarriage arm operably connected to the implement frame; and a track assembly pivotably connected to the undercarriage arm, the track assembly having a continuous track moveable around a plurality of rollers to contact an underlying surface beneath the farm implement; wherein the track assembly is configured to pivot about a pivot axis parallel to a roll axis of the farm implement to align the continuous track with the underlying surface.

In Example 10, the subject matter of Example 9 optionally includes wherein the track assembly further comprises: a track frame defining a socket for receiving a bearing stud of the undercarriage arm to pivotably connected the track assembly to the undercarriage arm; wherein the plurality of rollers are mounted on the track frame such that pivoting the track frame pivots the continuous track.

In Example 11, the subject matter of Example 10 optionally includes wherein the plurality of rollers comprises: at least two idler rollers; and at least one secondary roller positioned between the idler wheels; wherein the idler wheels and the secondary roller are oriented in a linear configuration to define a planar portion of the continuous track for interfacing with the underlying surface.

In Example 12, the subject matter of any one or more of Examples 9-11 optionally include a tilt control linkage having a first end pivotably connected to the track assembly and a second end having a stop block slidably received within a track in the undercarriage arm.

In Example 13, the subject matter of any of Example 12, wherein the camber stop block is slidable within the track along a slide axis transverse to the pivot axis to pivot the track assembly around the pivot axis.

In Example 14, the subject matter of Example 13 optionally includes wherein the undercarriage arm further comprises: a camber stop plate moveable to engage the camber stop block; wherein the camber stop plate prevents sliding of the camber stop block and pivoting of the track assembly about the pivot axis.

In Example 15, the subject matter of any one or more of Examples 12-14 optionally include wherein the tilt control linkage is offset from the undercarriage arm such that the tilt control linkage and undercarriage arm limit rotation of the track assembly in a plane parallel to the pivot axis.

In Example 16, the subject matter of any one or more of Examples 9-15 optionally include wherein the undercarriage arm further comprises: a vertical adjustment assembly movably connecting the undercarriage arm to the implement frame, the vertical adjustment assembly configured to move the undercarriage arm along a vertical axis to elevate and lower the track assembly.

Example 17 is a method of moving a farm implement, comprising: providing a implement frame having undercarriage arm pivotably connected to a track assembly, the track assembly having a continuous track moveable around a plurality of rollers; moving the frame implement across an underlying surface along a roll axis; and pivoting the track assembly around a pivot axis parallel to the roll axis to align the continuous track with the underlying surface.

In Example 18, the subject matter of Example 17 optionally includes wherein the track assembly further comprises: a track frame defining a socket for receiving a bearing stud of the undercarriage arm to pivotably connect the track assembly to the undercarriage arm; wherein the plurality of rollers are mounted on the track frame such that pivoting the track frame pivots the continuous track.

In Example 19, the subject matter of any one or more of Examples 17-18 optionally include connecting the track assembly to the undercarriage arm with a tilt control linkage, the tilt control linkage having a first end pivotably connected to the track assembly and a second end having a stop block slidably received within a track in the undercarriage arm; and sliding the camber stop block within the track along a slide axis transverse to the pivot axis to pivot the track assembly around the pivot axis.

In Example 20, the subject matter of any one or more of Examples 17-19 optionally include moving the undercarriage arm along a vertical axis to elevate and lower the track assembly.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

What is claimed is:

1. An undercarriage assembly for a farm implement, comprising:
   an undercarriage arm;
   a track assembly pivotably connected to the undercarriage arm, the track assembly having a continuous track moveable around a plurality of rollers to contact an underlying surface beneath the farm implement; and
   a tilt control linkage having a first end pivotably connected to the track assembly and a second end having a camber stop block slidably received within a track in the undercarriage arm,
   wherein the track assembly is configured to pivot about a pivot axis parallel to a roll axis of the farm implement to align the continuous track with the underlying surface.

2. The undercarriage assembly of claim 1, wherein the track assembly further comprises:
   a track frame defining a socket for receiving a bearing stud of the undercarriage arm to pivotably connected the track assembly to the undercarriage arm,
   wherein the plurality of rollers is mounted on the track frame such that pivoting the track frame pivots the continuous track.

3. The undercarriage assembly of claim 2, wherein the plurality of rollers comprises:
   at least two idler rollers; and
   at least one secondary roller positioned between the idler wheels,
   wherein the idler wheels and the secondary roller are oriented in a linear configuration to define a planar portion of the continuous track for interfacing with the underlying surface.

4. The undercarriage assembly of claim 1, wherein the camber stop block is slidable within the track along a slide axis transverse to the pivot axis to pivot the track assembly around the pivot axis.

5. The undercarriage assembly of claim 4, wherein the undercarriage arm further comprises:
   a camber stop plate moveable to engage the camber stop block,
   wherein the camber stop plate prevents sliding of the camber stop block and pivoting of the track assembly about the pivot axis.

6. The undercarriage assembly of claim 1, wherein the tilt control linkage is offset from the undercarriage arm such that the tilt control linkage and undercarriage arm limit rotation of the track assembly in a plane parallel to the pivot axis.

7. The undercarriage assembly of claim 1, wherein the undercarriage arm further comprises a vertical adjustment assembly for moving the undercarriage arm along a vertical axis to elevate and lower the track assembly.

8. A farm implement, comprising:
   an implement frame, wherein at least one farming tool is mounted on the implement frame;
   an undercarriage arm operably connected to the implement frame;
   a track assembly pivotably connected to the undercarriage arm, the track assembly having a continuous track moveable around a plurality of rollers to contact an underlying surface beneath the farm implement; and
   a tilt control linkage having a first end pivotably connected to the track assembly and a second end having a camber stop block slidably received within a track in the undercarriage arm,
   wherein the track assembly is configured to pivot about a pivot axis parallel to a roll axis of the farm implement to align the continuous track with the underlying surface.

9. The farm implement of claim 8, wherein the track assembly further comprises:
   a track frame defining a socket for receiving a bearing stud of the undercarriage arm to pivotably connected the track assembly to the undercarriage arm,
   wherein the plurality of rollers is mounted on the track frame such that pivoting the track frame pivots the continuous track.

10. The farm implement of claim 9, wherein the plurality of rollers comprises:
    at least two idler rollers; and
    at least one secondary roller positioned between the idler wheels,
    wherein the idler wheels and the secondary roller are oriented in a linear configuration to define a planar portion of the continuous track for interfacing with the underlying surface.

11. The farm implement of claim 8, wherein the camber stop block is slidable within the track along a slide axis transverse to the pivot axis to pivot the track assembly around the pivot axis.

12. The farm implement of claim 11, wherein the undercarriage arm further comprises:
    a camber stop plate moveable to engage the camber stop block,
    wherein the camber stop plate prevents sliding of the camber stop block and pivoting of the track assembly about the pivot axis.

13. The farm implement of claim 8, wherein the tilt control linkage is offset from the undercarriage arm such that the tilt control linkage and undercarriage arm limit rotation of the track assembly in a plane parallel to the pivot axis.

14. The farm implement of claim 8, wherein the undercarriage arm further comprises a vertical adjustment assembly movably connecting the undercarriage arm to the implement frame, the vertical adjustment assembly configured to move the undercarriage arm along a vertical axis to elevate and lower the track assembly.

15. A method of moving a farm implement, comprising:
providing an implement frame having undercarriage arm pivotably connected to a track assembly, the track assembly having a continuous track moveable around a plurality of rollers;
moving the frame implement across an underlying surface along a roll axis;
pivoting the track assembly around a pivot axis parallel to the roll axis to align the continuous track with the underlying surface;
connecting the track assembly to the undercarriage arm with a tilt control linkage, the tilt control linkage having a first end pivotably connected to the track assembly and a second end having a stop block slidably received within a track in the undercarriage arm; and
sliding the camber stop block within the track along a slide axis transverse to the pivot axis to pivot the track assembly around the pivot axis.

16. The method of claim 15, wherein the track assembly further comprises:
a track frame defining a socket for receiving a bearing stud of the undercarriage arm to pivotably connect the track assembly to the undercarriage arm,
wherein the plurality of rollers is mounted on the track frame such that pivoting the track frame pivots the continuous track.

17. The method of claim 15, further comprising moving the undercarriage arm along a vertical axis to elevate and lower the track assembly.

\* \* \* \* \*